April 11, 1961     H. M. VALENTINE     2,979,069
TRACTOR PROTECTION VALVE
Filed Feb. 20, 1959
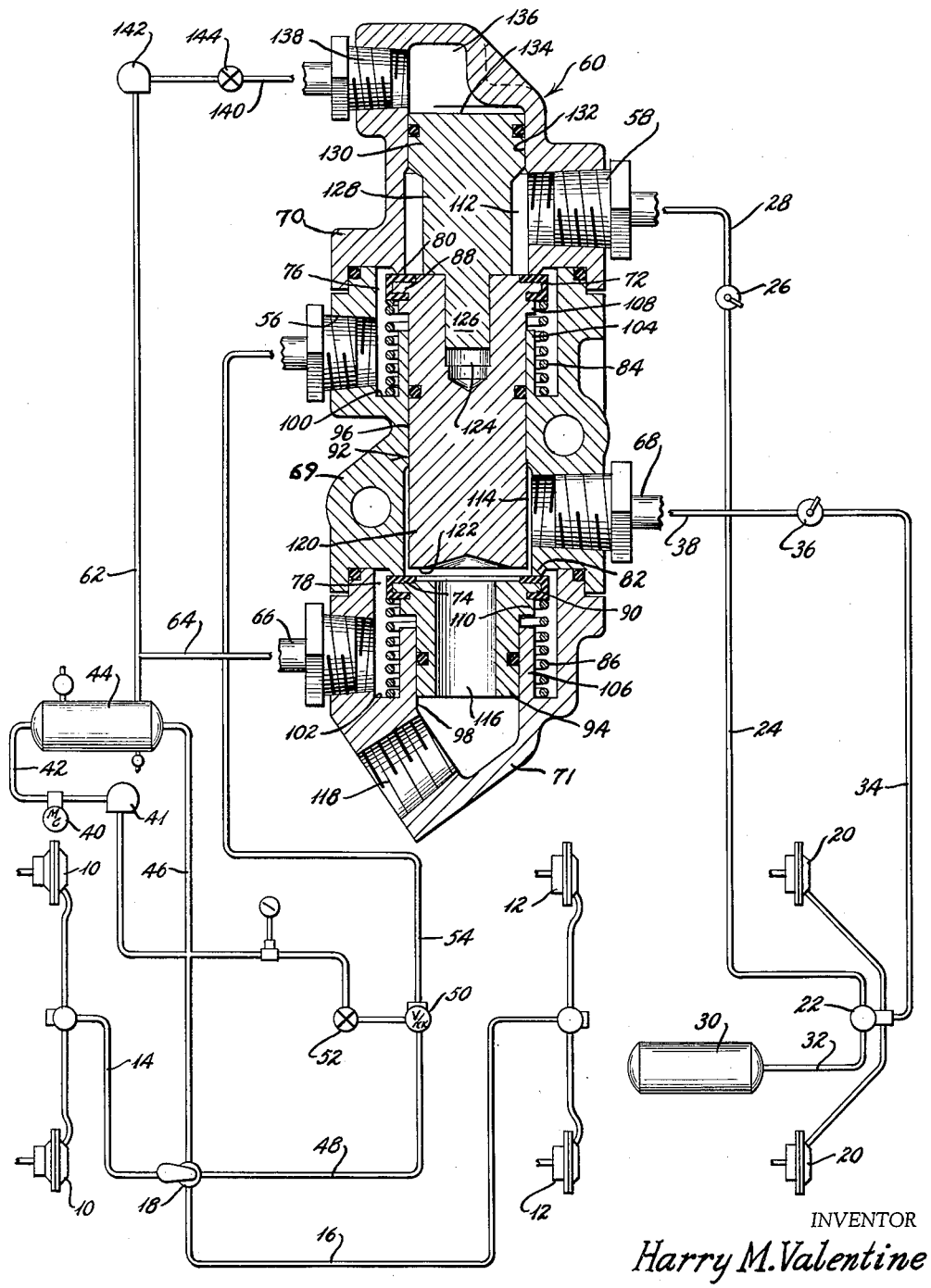
INVENTOR
*Harry M. Valentine*
BY *Scrivener & Parker*
ATTORNEYS

United States Patent Office 2,979,069
Patented Apr. 11, 1961

2,979,069

TRACTOR PROTECTION VALVE

Harry M. Valentine, Elyria, Ohio, assignor to Bendix-Westinghouse Automotive Air Brake Company, Elyria, Ohio, a corporation of Delaware Filed Feb. 20, 1959, Ser. No. 794,710

4 Claims. (Cl. 137—102)

This invention relates to fluid pressure braking systems for tractor-trailer vehicles and more particularly to improved tractor protection valve mechanism for conserving fluid pressure on the tractor and for automatically applying the vehicle brakes notwithstanding the occurrence of a break or leak in various of the brake lines on the vehicles or a separation of the vehicles in service.

Broadly the object of the present invention is to provide a tractor protection valve whose purpose and function is generally disclosed in the patent to Andrews, No. 2,850,330 and reference is made to that patent for a statement of the broad objects of the present invention.

Specifically it is an object of the present invention to provide a tractor protection valve mechanism which is simple in construction, inexpensive to manufacture and assemble, and reliable in operation.

Still another object of the invention is to provide an improved tractor protection valve which is responsive to tractor break-away or to a predetermined low pressure in either the tractor or trailer braking systems, to sequentially and in rapid order interrupt the tractor and trailer emergency lines, exhaust the trailer emergency line to atmosphere to produce automatic setting of the trailer brakes and thereafter interrupt the tractor and trailer service lines.

Still another object of the invention is to provide a tractor protection valve for accomplishing the foregoing wherein the pressure responsive means and the valve means for controlling the tractor and trailer service lines are constructed as a unitary piston-like member which eliminates any disadvantages in manufacture and use of a flexible diaphragm having means engageable with a separate valve device for accomplishing control of the tractor and trailer service lines.

Yet another object of the invention is to simplify construction of tractor-trailer protection valve mechanism by provision of a unitary piston-like combined pressure responsive and valve member as set forth in the foregoing paragraph and also by the provision of an exhaust port which is in close adjacency to the tractor and trailer emergency line valve so that not only is the structure simplified, but also extremely rapid exhaustion of the emergency line is afforded.

Other objects and their attendant advantages will become apparent as the following detailed description is read in conjunction with the accompanying single figure which illustrates diagrammatically a tractor-trailer braking system employing the tractor protection valve of the present invention.

As shown, the present invention is utilized in connection with a tractor-trailer braking system of a well-known air pressure operated type. The tractor portion of the braking system illustrated is for use on a tractor having front and rear axles, the respective wheels of which are provided with brake chambers 10, 12 which are interconnected by service conduits 14, 16 through the usual pedal operated brake valve 18.

The trailer portion of the braking system illustrated is for use on a semi-trailer equipped with a single axle having wheels provided with brake chambers 20 which are controlled through the medium of a relay emergency valve 22 of well-known construction. The valve 22 receives service pressure through a conduit 24 leading forwardly to the front end of the trailer where the latter is connected through a usual cut-out cock 26 with a corresponding tractor service line 28. The relay emergency valve 22 is provided with an emergency reservoir 30 supplied with fluid pressure through a conduit 32 which is connected through the valve 22 with an emergency conduit 34 which leads forwardly for connection to a cut-out cock 36 which in turn is connected to a tractor emergency conduit 38.

Fluid pressure for the system so far described in supplied by the usual tractor-carried compressor 40, controlled by the usual governor 41, which is connected by a conduit 46 to a main reservoir 44 on the tractor. The conduit 46 supplies pressure from the reservoir 44 to the brake valve 18 and leading from the latter is a conduit 48 which may be connected through a conventional double check valve 50 (selectively controlled by either the pedal 18 of a hand operated valve 52 in the usual manner) to a conduit 54 which is connected to the aforedescribed interconnected tractor-trailer service lines 28, 24 through ports 56, 58 of a tractor protection valve device 60 constructed in accordance with the present invention and hereinafter described in detail. Connected also to the tractor reservoir 44 is conduit 62 having a branch 64 which is connected through ports 66, 68 of the protection valve 60 with previously described tractor-trailer emergency conduits 38, 34.

The tractor protection valve 60 of the present invention comprises a body 69 and upper and lower end covers 70, 71 containing check valve members 72, 74 which are respectively positioned in the tractor service and emergency lines between the ports 56, 58 and 66, 68. The valves 72, 74 are positioned respectively in service and emergency inlet chambers 76, 78 in the body 69 and are normally urged against their respective valve seats 80, 82 in the direction of fluid flow by springs 84, 86 so as to interrupt communication between service conduits 54, 28 and emergency conduits 64, 38. The service and emergency check valves 72, 74 may each be of an annular channel shape constructed of rubber or similar material adapted to engage respectively flanges 88, 90 integral with piston or plunger-like members 92, 94 slidingly received in axially aligned bores 96, 98 in the body member 69. Annular recesses 100, 102 surround the bores 96, 98 and form in part the inlet chambers 76, 78 as well as forming upwardly extending necks 104, 106 which serve as supports or guides for the springs 84, 86 and also abutments or stops for one or both of shoulders 108, 110 on plunger members 92, 94 when these are moved from the position of the drawing to valve opening position by means to be described.

The outlet ports 58, 68 respectively communicate with outlet chambers 112, 114 which are normally maintained disconnected from the respective inlet chambers 76, 78 by the valves 72, 74 as above described. The emergency plunger member 94 is centrally drilled to provide an exhaust passage 116 which normally communicates the outlet chamber 114 with atmosphere through an exhaust port 118 which communicates with the bore 98. The piston-like member 92 has a downwardly extending lower portion or plunger 120 which projects into the outlet chamber 114 and terminates, when in normal position, a slight distance above member 94 with the outer lower annular edge 122 of the plunger portion 120 being in axial alignment with an inner annular part of check valve 74 so that when the member 92 is initially moved downwardly, the edge 122 of extension 120 sealingly engages valve 74 to disconnect exhaust passage 116 and exhaust port 118 from outlet chamber 114, with continued movement of member 92 disengaging valve 74 from seat 82 to connect emergency inlet chamber 78 with the outlet chamber 114 thus affording free communication between the tractor and trailer emergency conduits 64, 38.

The member 92 carrying the service check valve 72 may be provided with an axial blind bore 124 which may receive with a force fit an extension 126 integral with the lower portion 128 of a piston member 130 slidingly and sealingly received in a cylindrical bore 132 at the upper end of cover 70. In accordance with the invention the piston member 130 and the member 92 form a unitary structure and could, if desired, be machined as a single unit and should be considered as such. The upper side 134 of piston 130 affords a pressure responsive control surface which is exposed to the pressure in a control cavity 136 formed in the upper end of the cover 70. This cavity is provided with a port 138 connected to a conduit 140 leading to one side of a fluid pressure governor 142 of well-known construction whose opposite side is connected to the aforementioned conduit 62 which in turn is directly connected to the tractor main reservoir 44. A manually operated three-way valve 144 may be provided in the conduit 140 for alternately connecting port 138 with the governor 142 or with atmosphere at the will of the operator.

As thoroughly explained in the patent to Andrews, previously referred to, the purpose of the present invention is to conserve sufficient pressure in the tractor system for normal brake operation by disconnecting the tractor and trailer portions of the braking system in the event of trailer break-away or in the event of loss of pressure anywhere in the system to a predetermined low value. Simultaneously with the disconnection of the two portions of the system, the trailer emergency line is exhausted by the valve of the invention to atmosphere to cause an automatic setting of the trailer brakes in a manner well understood by those familiar with the art.

In operation, assuming a no-air condition of the braking system so that the parts of the valve mechanism 60 are in the position of the drawing, when the compressor 40 is operated it delivers pressure to main reservoir 44 from whence pressure flows to governor 142, brake valve 18, and emergency inlet port 66 of valve 60. Further progress of air pressure through the system is blocked until such time as the main reservoir pressure reaches a predetermined high value at which point the governor 142 operates to connect conduits 62, 140 to admit full reservoir pressure to the control cavity 136. Upon this occurrence piston member 134 moves downwardly, sequentially unseating service check valve 72, closing exhaust passage 116 in the emergency valve member 94, and unseating emergency check valve 74. As soon as the latter valve is opened, fluid pressure flows through tractor-trailer emergency conduits 64, 38 and the trailer relay emergency valve 22 to the trailer emergency reservoir 30 which is then charged to operating pressure in the usual manner.

So long as the pressure in the system remains between the limits of the setting of governor 142 so that main reservoir pressure is supplied to control cavity 136, the tractor-trailer braking system operates exactly as if the protection valve 60 did not exist in the system. However, should for any reason the pressure in the main reservoir fall to a level below the low setting of governor 142, this operates to disconnect conduits 62, 140 and connect the latter to atmosphere thereby exhausting the pressure in control cavity 136. Upon this occurrence the springs 84, 86 immediately move their respective check valves 72, 74 to closed position thus disconnecting the tractor and trailer service and emergency lines and substantially simultaneously connecting the emergency conduits 34, 38 to atmosphere through passage 116 and port 118 so as to cause the trailer relay emergency valve to apply the trailer brakes.

From the foregoing description it will be observed that, before the service check valve 72 can move to its full closed position, the emergency check valve 74 must first close and the trailer emergency conduit be connected to atmosphere. By insuring that the emergency line is connected to atmosphere before the service check valve is closed, it would be impossible to isolate a leak in the trailer service line without first exhausting the trailer emergency line, which isolation might occur if the check valves were arranged so that the service check valve closed before the emergency line could be connected to atmosphere.

In the event that some emergency should arise whereby the operator wished to initiate an emergency operation of the trailer brakes he would merely operate the manual three-way control valve 144 to connect the control cavity 136 to atmosphere ahead of the governor 142.

In the event of trailer break-away, an emergency setting of the trailer brakes would automatically take place because of the broken emergency conduit 34. Following such a break-away the entire tractor system would rapidly blow-down to the low setting of governor 142 which would then operate to exhaust control cavity 136 thus closing the service and emergency check valves to preserve sufficient braking pressure in the main reservoir so that the operator could brake the tractor to a stop in the usual manner.

A particularly advantageous feature of the present invention is the provision of a unitary control piston and service check valve. This arrangement assures positive coordinated operation of both the control member and the emergency and service check valves. In addition to reliable operation, a unitary construction enables the valve to be constructed and assembled with a minimum of expense. A second advantageous feature of the invention resides in the provision of an emergency conduit exhaust port in close adjacency to the emergency check valve. This arrangement insures substantially instantaneous exhaustion of the trailer emergency conduit during emergency conditions.

It will be apparent to those skilled in the art that the valve of the present invention is susceptible of various changes and modifications without, however, departing from the scope and spirit of the appended claims.

What is claimed is:

1. A tractor protection valve adapted to connect tractor and trailer service and emergency lines of a tractor-trailer fluid pressure operated brake system, comprising a casing provided with axially aligned serially arranged control chamber, service outlet and inlet chambers, emergency outlet and inlet chambers and an exhaust port, said outlet and inlet chambers respectively adapted to be connected with said trailer and tractor service and emergency lines, and said exhaust port communicating with atmosphere, an emergency valve within said emergency inlet chamber, a spring acting on said emergency valve to normally close communication between said emergency inlet and outlet chambers, a piston in said control chamber movable towards or away from said inlet and outlet chambers, a part integral with said piston and extending through said service outlet and inlet chambers and terminating in said emergency outlet chamber, a service valve within said service inlet chamber and integrally connected to the part of said piston in said latter chamber, a spring acting on said piston to urge it to a position wherein said service valve normally closes communication between said service inlet and outlet chambers, the part of said piston in said emergency outlet chamber when said valves are in closed position being spaced from said emergency valve but being engageable with said valve to open the same when said piston is moved in a valve opening direction, and a passageway through said emergency valve normally connecting said emergency outlet chamber and said exhaust port when said valves are in their normal closed position but being closed by the part of said piston in said emergency outlet chamber when said piston is moved in a valve opening direction.

2. A tractor protection valve adapted to connect tractor and trailer service and emergency lines of a tractor-trailer fluid pressure operated brake system, comprising a casing provided with axially aligned serially arranged service outlet and inlet chambers and emergency outlet and inlet chambers respectively adapted to be connected with the trailer and tractor service and emergency lines, a service valve within said service inlet chamber, a spring acting to normally close said valve to close communication between said service inlet and outlet chambers, an emergency valve within said emergency inlet chamber, a spring acting to normally close said emergency valve to close communication between said emergency inlet and outlet chambers, a piston in said casing movable axially towards or away from said chambers, a plunger integrally attached to said piston and said service valve whereby said service valve is opened upon movement of said piston towards said chambers, said plunger having an extension engageable with said emergency valve to open the same upon movement of said piston, plunger and service valve as a unit theretowards, said extension when said valves are in closed position being spaced from said emergency valve so that said service valve opens before said emergency valve when said piston and plunger are moved in a valve opening direction and said emergency valve closes before said service valve when said piston and plunger are moved in the opposite direction.

3. Valve means as set forth in claim 2 including in addition an exhaust port in said casing arranged in axial serial relationship with said emergency outlet chamber, an exhaust passage through said emergency valve affording communication between said exhaust port and said emergency outlet chamber, and means cooperating with said plunger extension to close said passage before said emergency valve is opened when said plunger is moved in a valve opening direction and to open said passage after said emergency valve is closed when said plunger moves in the opposite direction.

4. A tractor protection valve comprising a housing, a piston slideably received in said housing, a first chamber adjacent said piston, a second chamber on the opposite side of said piston, an outlet in said second chamber for receiving a trailer service line, a third chamber adjacent said second chamber, an inlet in said third chamber for receiving a tractor service line, a service valve in said third chamber movable by said piston to control communication between said third and second chambers, said service valve having an imperforate piston member connected thereto and mounted for sliding movement in said housing, a fourth chamber adjacent the lower portion of said piston member, an outlet in said fourth chamber for receiving a trailer emergency line, a fifth chamber adjacent said fourth chamber, an inlet in said fifth chamber for receiving a tractor emergency line, an emergency valve in said fifth chamber movable by said service valve to control communication between said fifth and fourth chambers, a sixth chamber in series with said fourth chamber, an exhaust outlet in said sixth chamber, an exhaust valve in said fourth chamber movable by said service valve to control communication between said fourth and sixth chambers, and resilient means associated with said valves normally urging said service and emergency valves to their closed positions and said exhaust valve towards its opened position.

References Cited in the file of this patent

UNITED STATES PATENTS

| | | |
|---|---|---|
| 2,645,308 | Fitch et al. | July 14, 1953 |
| 2,850,330 | Andrews | Sept. 2, 1958 |
| 2,859,763 | Fites | Nov. 11, 1958 |